United States Patent [19]

Kumagai et al.

[11] 3,833,756

[45] Sept. 3, 1974

[54] COLOR TELEVISION SIGNAL GENERATOR

[75] Inventors: Mituru Kumagai, Kawasaki; Takeshi Sasaoka; Yoshiaki Nakayama, both of Tokyo, all of Japan

[73] Assignees: Fuji Shashin Film Kabushiki Kaisha; Ikegami Tsushinki Co., Ltd., both of Kanagawa-ken, Japan

[22] Filed: Aug. 9, 1972

[21] Appl. No.: 279,231

[30] Foreign Application Priority Data

Aug. 9, 1971 Japan ................................ 46-60439

[52] U.S. Cl....... 178/5.4 R, 178/5.2 A, 178/DIG. 28

[51] Int. Cl. ............................................. H04n 9/02

[58] Field of Search....... 178/DIG. 28, 5.2 A, 5.2 D, 178/5.4 CD, 6.8, 6.7 A, 7.2, 7.7

[56] References Cited

UNITED STATES PATENTS

| | | | |
|---|---|---|---|
| 3,249,691 | 5/1966 | Bigelow ........................ | 178/DIG. 28 |
| 3,655,908 | 4/1972 | Goldberg et al. ............. | 178/5.4 CD |
| 3,723,650 | 3/1973 | Bradley ........................ | 178/DIG. 28 |

OTHER PUBLICATIONS

Goldmark, "Color EVR," 9/70, pgs. 30–31, IEEE Spectrum.

Fisher, "Coming: Your Super–8 Movies on Your Own TV," 12/71, pg. 60, Popular Science.

*Primary Examiner*—Richard Murray
*Attorney, Agent, or Firm*—Stevens, Davis, Miller & Mosher

[57] ABSTRACT

Disclosed is a color television signal generator which is capable of producing color television signals directly from an 8 mm-width color film to reproduce the colored images of the film on a home-use color television. The present generator uses a polygonal prism which is rotated in synchronous relation with the feeding of the film, thus assuring that the raster on the flying-spot scanner is in register with the frame of the film, no matter what the feeding speed of the film is. Also, the present generator includes a color reproduction compensator which functions to subtract green and blue contents from the red component color, thus reproducing the color image of the film on the home-use color television with high fidelity of color.

16 Claims, 17 Drawing Figures

COLOR TELEVISION SIGNAL GENERATOR

This invention generally relates to an apparatus for generating color television signals, and more particularly it pertains to an apparatus for generating color television signals of the type in which a flying spot scanner is used for raster-scanning of the conventional color movie film which is contained in and supplied from a cassette, thus finally producing color television signals which are adapted to be supplied to home-use color television sets for reproducing corresponding colored images.

The video tape recorder has been widely used for generating television signals. This apparatus has an elaborate magnetic sweeping mechanism and is therefore very expensive as is the video tape used. For this reason the video tape recorder has not been popular for home-use.

Recently, a television signal generator called "Electronic Video Recorder" or "EVR" has been produced. This television signal generator uses photofilm and the generator includes a flying spot scanner for photoscanning of the film. Advantageously, this type of television signal generator uses photofilm which is far less expensive than video-tape, and also advantageously the generator has a sweeping means which is very simple and cheap, compared with the elaborate magnetic sweeping mechanism of the video tape recorder. In the Electronic Video Recorder, however, the color information must be stored in the photofilm in encoded form. This prevents the direct use of conventional 8 mm-width color movie film. More specifically it is impossible to generate color television signals directly from 8 mm-width movie film, and disadvantageously the reproduction of the color image on the television faceplate requires the extra operation of encoding the color information from the 8 mm-width movie film and of recording the code signals on a side track of the film bearing black and white images thereon to a different special photofilm. For this reason the Electronic Video Recorder has not been widely used. In this respect the video tape recorder is superior to the Electronic Video Recorder. Because the image can be stored on the video tape by a television camera, and the image can be reproduced directly from the video tape.

One object of this invention is to provide an apparatus for generating color television signals directly from color movie film.

Another object of this invention is to provide a signal generator of the above mentioned type which is capable of providing pure color component signals, thus finally causing the resultant colored image to appear with very high fidelity on the color television faceplate.

Still another object of this invention is to provide a color television signal generator which is simple in structure and cheap in cost.

A color television signal generator according to this invention comprises a flying spot scanner, an optical system which allows the flying spot from the scanner to pass to a strip of color movie film through a rotatable polygonal prism, a drive means for feeding the strip of color movie film, a synchronizing means for rotating the polygonal prism in synchronous relation with the feeding of the film, a spectroscope for dividing the light passing through the film into red, green and blue color components, photo-electric converter means for converting these three different color components to the corresponding electric signals, a compensator for reversing and adding selected parts of the blue and green color component signals to the red color component signal to improve the characteristics of final color reproduction, a matrix circuit responsive to the three color component signals thus compensated to provide the "brightness" signal and the "chromaticity" signal, a color encoder functioning to combine the "brightness" signal and the "chromaticity" signal with the synchronizing signal from the flying spot scanner to provide a composite color image signal, and a modulator for modulating a carrier of a given frequency with the composite color image signal.

This invention will be better understood from the following description which is made with reference to the attached drawings.

Figure 1:
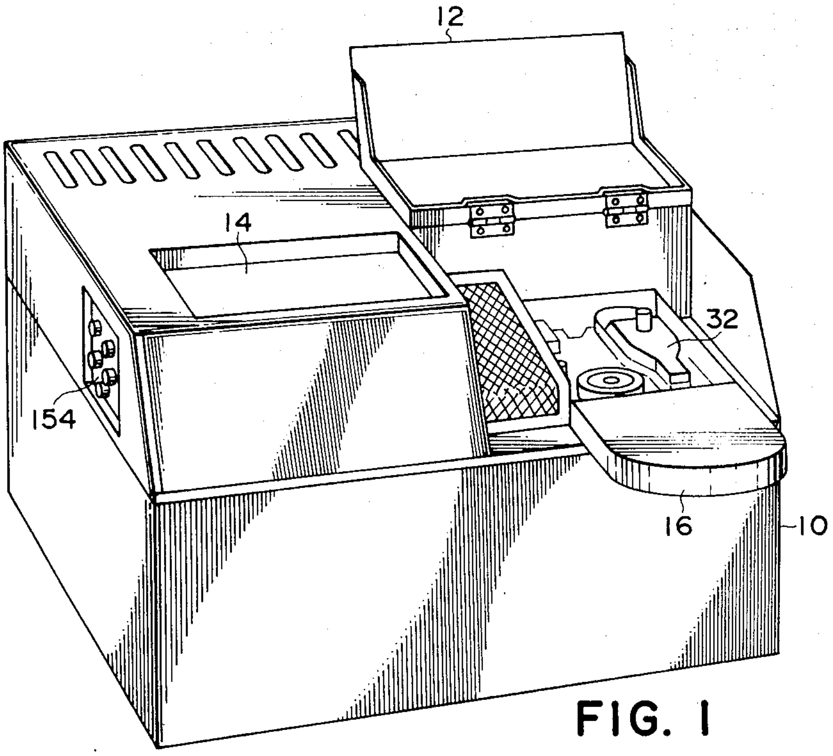
FIG. 1 is a perspective view of one embodiment of this invention.
Figure 2:
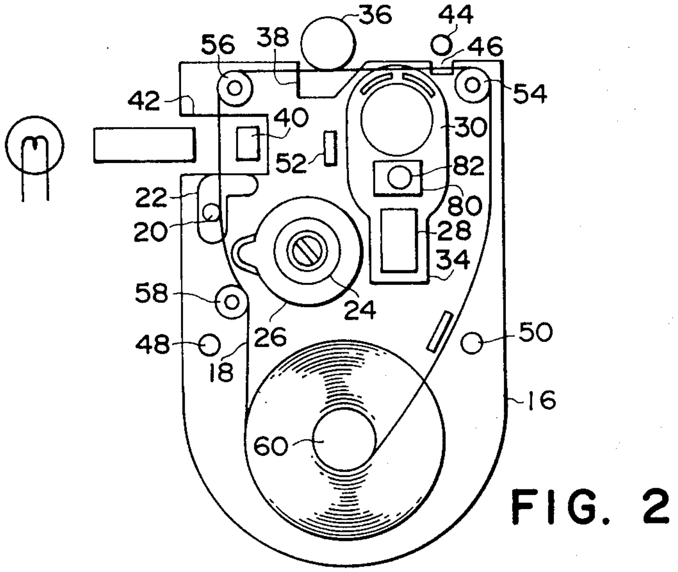
FIG. 2 is a plan view of an 8 mm-width movie film cassette with the upper cover plate taken off.

Referring to the drawings, particularly to FIG. 1, a color television signal generator is perspectively shown. A lid 12 opens on hinges. A control panel 14 is mounted on the top and left portion of the housing 10. An 8 mm-width film cassette 16 is loaded. The cassette 16 along with the cooperating members are shown in detail in FIG. 2. The cassette has apertures or openings and notched portions. They are the aperture 22 to receive the capstan 20 for feeding the film; the aperture 26 to receive the pinch roll 24; the opening 34 to receive a case 32 (see FIG. 1); the notched portion 38 to receive the sprocket 36; the notched portion 42 to receive a photo electric converter element 40 for reproducing the audio-signals optically recorded on the film; and the notched portion 46 to receive the film pressing roll 44. The case 32 contains a reflector mirror 28 a projecting lens and a rotatable sixteen-side prism 30. The reflector mirror functions to guide the beam from the cathode ray tube of the flying spot scanner to the film 18. The cassette also has guide pins, apertures 48, 50 to receive lock means and a slot 52. The guide pins function to guide the cassette body when loaded in the present television signal generator, and at the same time function to put the cassette 16 in the proper position.

Guide rolls 54, 56 and 58 are provided in the cassette 16. Also, a reel 60 around which the film is wound is provided in the cassette 16. The cassette in this embodiment is of the endless type in which the tape when drived is pulled out from the center of the wound tape roll 60 and is fed back to the outer periphery of the tape roller in the form of a closed loop.

Figure 3:
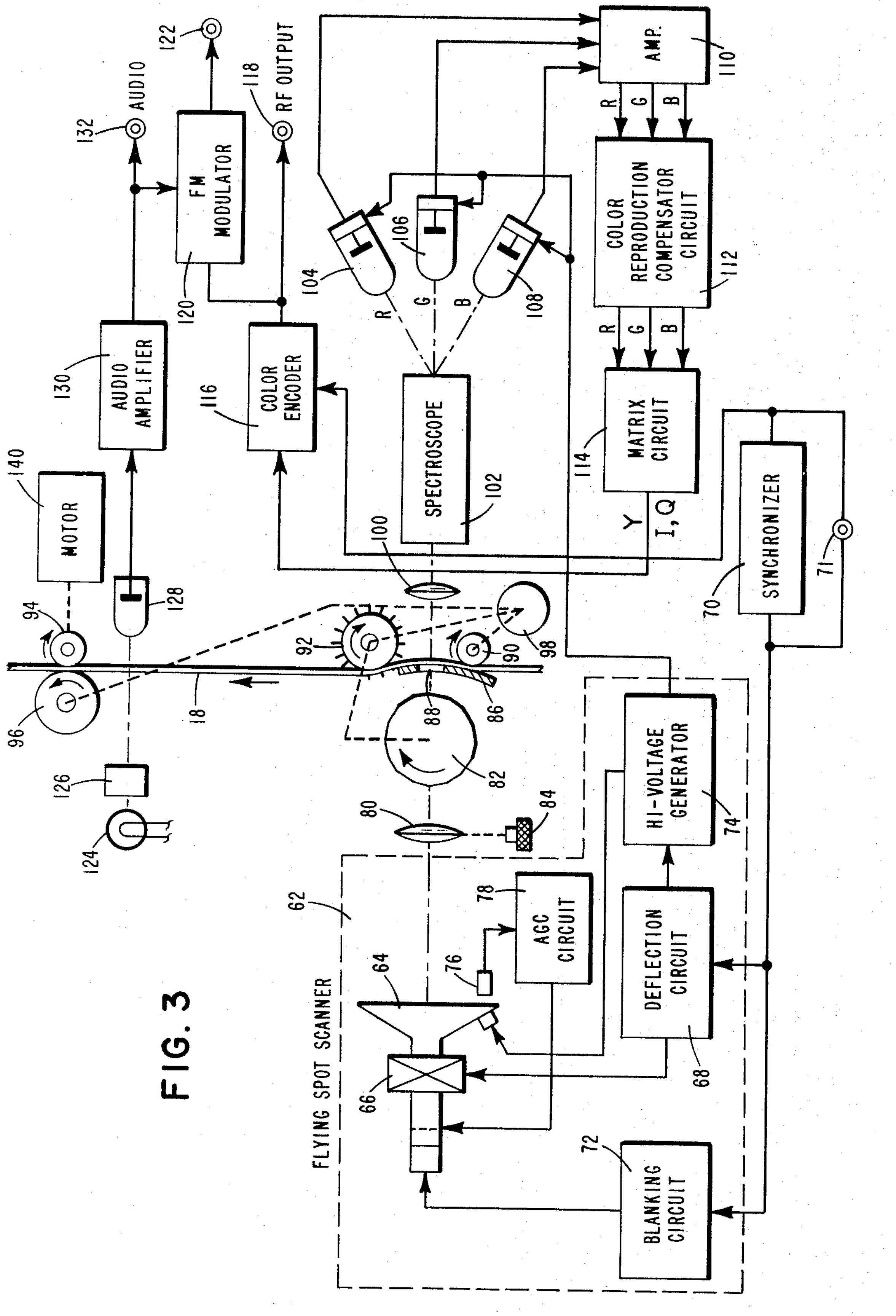
FIG. 3 is a schematic diagram showing the whole structure of one embodiment of this invention.

In FIG. 3 there is schematically shown a television signal generator according to this invention.

A flying spot scanner 62 has a cathode ray tube 64, which includes horizontal and vertical deflection coils 66. If the horizontal and vertical signals are supplied from a deflection circuit 68 to the coils 66, a raster will be produced on the face plate of the cathode ray tube. Synchronizing signals are supplied from the synchronizer 70 to the deflecting circuit 68. If an exterior synchronizer is used, signals therefrom will be supplied to the terminals 71 bearing the indication to read "Exterior Synchronization." Horizontal and vertical blanking signals are supplied from the blanking circuit 72 to the cathode of the cathode ray tube 64. Synchronizing signals are supplied from the synchronizer 70 to the blanking circuit 72. A high-voltage generator 74 functions to derive a dc high voltage from the horizontal deflecting signal, and apply the dc high voltage to the anode of the cathode ray tube 64, as is the case with the conventional television receiver.

Figure 7:
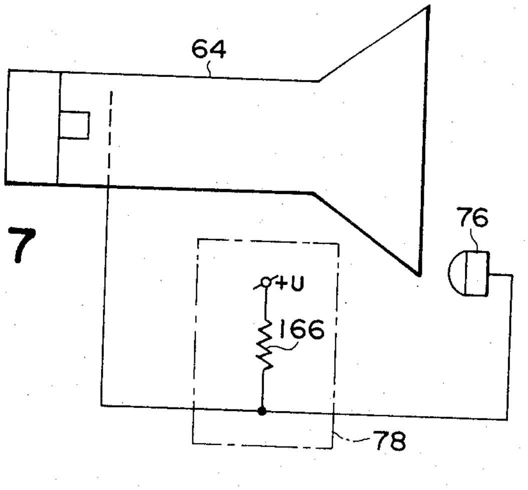
FIG. 7 is a schematic diagram showing a circuit for maintaining the brightness of the photo spot at a given level constant on the face plate of the cathode ray tube used in the flying spot scanner.

A photovoltaic element 76 such as PbS is positioned in front of the face plate of the cathode ray tube 64 of the flying spot scanner 62 (see FIG. 7). As a matter of course this element is put in such a position that it will be no hindrance to sight of the raster.

The photovoltaic cell 76 is responsive to the light spot appearing on the face plate of the cathode ray tube 64 to provide an output voltage signal representing the intensity of the light spot. This output voltage is supplied to the AGC circuit 78, and the control voltage from the AGC circuit is, in turn, supplied to the grid electrode of the cathode ray tube 64, thus maintaining the intensity of the light spot at a given constant level. The AGC circuit will be described in detail.

Figure 4:
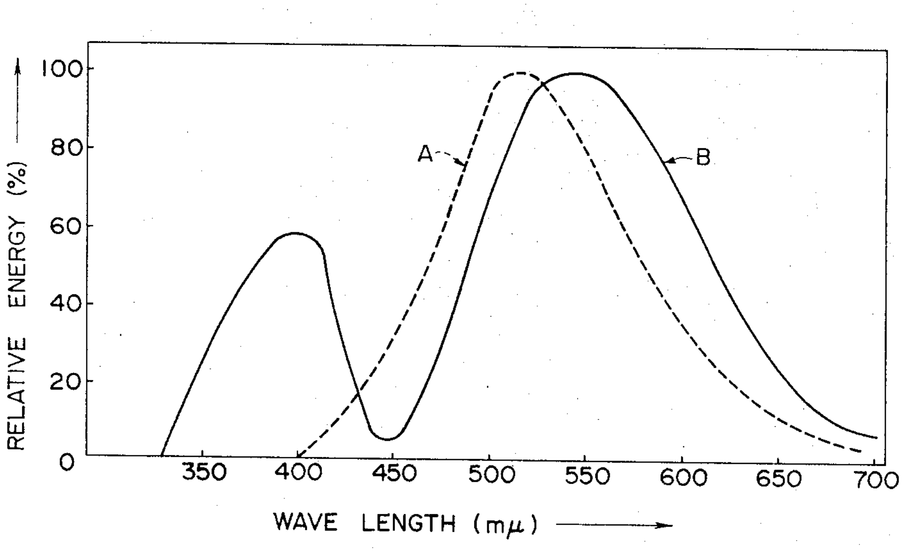
FIG. 4 is a graph showing the energy spectra of phosphor luminescence from the cathode ray tube of the flying spot scanner.

The cathode ray tube 64 uses a phosphor layer composed of a mixture of two different phosphor materials. In FIG. 4, the curve A (broken line) shows the energy spectrum of a phosphor material, whereas the curve B (solid line) shows the energy spectrum of a mixture of two different phosphor materials. The curve A pertaining to a non-mixed phosphor material, such as "Phosphor P24" has the peak value at the wave-length of about 520 mμ.

Compared with this, the curve B pertaining to the mixed phosphor material, such as a mixture of "PYP" and "PFE" has two peak values at wave lengths of about 400 mμ and 550 mμ. The luminescence or radiation from the mixed phosphor screen has blue and green components of relatively large energy and red component of relatively small energy. When the beam of luminescence passes through the color film, the contents of the component colors will be modified according to the transparence characteristics of the color film (see FIG. 14). Thus, the beam of luminescence after passing through the film, has three color components of comparable amount, but each color component contains substantial fractions of the other color components. These foreign contents will lower the fidelity of color reproduction. Above all, the inclusion of blue and green in the red component deteriorates the quality of color when reproduced. In this connection this invention uses a cathode ray tube scanner having a mixed-phosphor screen, the blue and green contents can be subtracted from the red color signal by reversing selected parts of the blue and green color signals and by adding these reversed signals to the red color signal. If a cathode ray tube having a non-mixed phosphor screen were used, the compensating signals to be added to the red color signal could be hardly produced.

The light from the flying spot scanner 62 is allowed to pass to the rotatable sixteen-side prism through a group of reflector mirrors (one of these mirrors is shown at 28 in FIG. 2) and a projecting lens 80. The position of the projecting lens 80 can be adjusted by a focus control knob 84, thus allowing the raster image of the flying spot scanner 62 to focus on the film 18. The sweep region by the flying spot passing through the rotatable prism is limited by the window opening 88. The film 18 is pushed against the film guide plate 86 by the film press roll 90. The feeding of the film 18 is performed by the capstan 94 and the pinch roll 96. The displacement of the film press roll 90, the sprocket 92 and the pinch roll 96 from the film can be simultaneously controlled by an actuating means consisting of a the rotary solenoid 98. More specifically in the inoperative condition the film press roll 90, the sprocket 92 and the pinch roll 96 are displaced from the film 18, and as mentioned later, if the button 138 bearing the indication to read "PLAY" is pushed, the rotary solenoid 98 will actuate to simultaneously push the film press roll 90, the sprocket 92 and the pinch roll 96 against the film 18.

The rotary prism 82 and the sprocket 92 are ganged with each other by means of gearing, thus assuring the synchronous drive of the prism and the sprocket. When the film 18 is driven by the capstan 94 and the pinch roll 96, the sprocket 92 having the teeth engaged with the sprocket apertures of the film 18 will be rotated, and at the same time the rotatable prism 82 will be synchronously rotated. The sixteen-side prism 82 is used to change the feeding rate of the 8 mm-width film (24 frames/sec.) to the rate of the frame recurrence in television (39 frames/sec.). The driving of the sixteen-side prism in synchronism with the feeding of the film assures that the raster on the cathode ray tube 64 will focus on the frame of the film, no matter what speed it may be fed. More particularly the raster will stay on the frame of the film if the film is fed at a speed other than the normal speed, or even if the film stops and the raster image cannot extend on either side of the boundary of adjacent frames.

The light after passing the film 18 will be converged by the condenser lens 100, and the light thus converged is allowed to pass to the three-color spectroscope 102. Red, green and blue color components R, G and B from the spectroscope 102 are allowed to pass to three photoelectric converter elements 104, 106 and 108. In this particular embodiment the photoelectric converters are photomultiplier tubes.

A relatively high voltage from the high-voltage genrator 74 of the flying spot scanner 62 can be applied to the photomultiplier as the bias voltage, thus eliminating the necessity of providing to high voltage source exclusively allotted to the photomultiplier tube.

The color component signals from the photomultipliers 104, 106, 108 are amplified in the amplifier 110. The different color signals R, G and B are fed to a color-reproduction compensator circuit 112, which functions to reverse selected parts of the blue and green component signals and to add the signals thus reversed to the red component signal so as to reduce the adverse effect of the foreign color contents in the red component signal, and finally improving the fidelity with which the color image is reproduced.

The color component signals R, G and B thus amplified and compensated are fed to a matrix circuit 114, in which these color component signals are converted into the color television image signal according to the standard of the color television signal. More specifically the intensity signal Y and the chromaticity signals I and Q are produced according to the following formula:

$$Y = 0.30R + 0.59G + 0.11B$$

$$I = 0.60R - 0.28G - 0.32B$$

$$Q = 0.21R - 0.52G + 0.31B$$

The intensity signal Y and the chromaticity signals I, Q are fed to a color encoder 116. The horizontal and vertical synchronizing signals are fed from the synchronizer 70 to the color encoder 116 in which the intensity signal Y and the chromaticity signal I and Q are adjusted in phase, and at the same time, the synchronizing signal and the burst signal are added, thus finally providing the composite color image signal.

The output signal from the color encoder 116 is fed both to a monitor video-output terminal 118 and a modulator 120. In this modulator a carrier wave of a given frequency is frequency modulated with the composite color image signal from the color encoder 116 to provide a color television signal similar to that in a television broadcast. The color television signal thus produced is fed to a terminal 122 bearing the indication "RF output" (radio frequency output).

A light source 124, a condenser lens 126 and a photoelectric converter element 128 are provided to reproduce the audio-information from the film 18. The audio-signal from the photo-electric converter 128 is amplified in audio-amplifier 130. The output signal from this amplifier 130 is fed to a terminal 132 bearing the indication "Monitor Audio-Signal," and at the same time to the modulator 120, in which an audio-carrier of a given frequency is frequency-modulated with the output signal from the audio-amplifier 130.

In reproducing colored images on the monitor, the image signal and the audio-signal from the monitor output terminals are used. In reproducing colored images on the conventional home use color television, the color television signal from the RF output terminal 122 is used. In the latter case any channels which are not occupied by the existing television broadcastings may be used.

Figure 5:
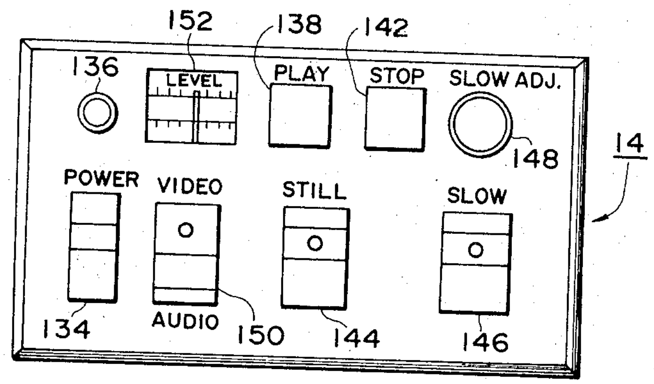
FIGS. 5 and 6 show the front panel of the color television signal generator and the control panel of same respectively.

As mentioned earlier, the color television signal generator according to this invention can operate in different phases; particularly at the normal speed of the film 18, at a speed lower than the normal speed or at a stop. The operations of such different phases will be described below in more detail. Referring to FIG. 1, the control panel 14 is on the upper and left portion of the housing 10. The structure of the control panel is shown in detail in FIG. 5. When a POWER switch 134 is operated, a pilot lamp 136 will be switched on. In reproducing images at the normal speed the button 138 bearing the indication PLAY is pushed to energize the rotary solenoid 98 thus pushing the film press roll 90, the sprocket 92 and the pinch roll 96 against the film 18. The motor 140 (FIG. 3) has been put into operation before the PLAY switch is operated, and therefore the power will be transmitted to a flywheel (not shown) which is coupled with the capstan 94 through the conventional transmission system comprising a belt, a pulley and other linkages, thus allowing the capstan 94 to rotate at a given speed. When the pinch roll 96 is pushed against the capstan 94 to hold the film 18 therebetween, the film 18 is driven upward in the direction indicated by the arrow at a given speed (24 frames/sec for the normal operation of image reproduction).

The running of the film will cause the sprocket 92 to rotate at a given constant speed. The rotation of the sprocket 92 is transmitted to the rotatable sixteen-side prism 82 through the synchronous drive mechanism, thus also rotating the prism at a given constant speed. The ratio of the prism rotating speed to the film running speed is so determined that the flying spot scanner 62 may sweep the film 18 at the same frequency or recurrence of 30 frames per sec if the film 18 runs at the speed of 24 frames per sec. In this particular case one of four successive frames will be swept twice. This will cause no hindrance to the eyes of the person watching television.

The button 142 bearing the indication STOP is pushed to energize a pull solenoid (not shown) to cause the film press roll 90, the sprocket 92 and pinch roll 96 to depart from the film 18.

A switch 144 bearing the indication STILL is for generating still image signals. The PLAY button 138 is pushed, and then the STILL button 144 is pushed to allow the flying spot to repeatedly scan the instantaneous frame, thus generating still image signals. More specifically, the closure of the STILL switch 144 will cause the pinch roll 96 to depart from the film 18, and at the same time, will put the audio information line into OFF condition. Thus, the film does not run, and therefore neither sprocket 92 nor prism 82 rotate, although the motor 140 is still running and the capstan 94 is also rotating. No matter where the film 18 stops, the sprocket 92 remains engaged with the film 18, and owing to the ganging relation between the sprocket 92 and the rotatable prism 82 the frame of the film is always put into registration with the raster of the flying spot scanner 62 thus assuring the sweeping of the image on a single film frame to produce the corresponding still image on the television face plate. The opening of the STILL switch 144 will cause the pinch roll 96 to push the film 18 against the capstan 94, thus permitting the film to run at the normal speed and permitting the normal sweeping of the film.

A switch 146 bearing the indication SLOW is for generating slow-moving video-signals. More specifically, the closure of this SLOW switch 146 will cause the running speed of the motor 140 and hence the film feeding speed to slow down, thus finally providing slow-moving images on the television face plate. In this case the audio-signal channel is put in "Off" condition as is the case with the production of a still image mentioned earlier. A knob 148 bearing the indication SLOW ADJ. is used to adjust the speed-reduction rate in producing slow-motion image signals. This knob when rotated, will function to vary the resistance included in the motor controlling circuit so as to control the speed of the motor 140, thus finally varying the speed reduction rate of the motion picture.

Figure 6:
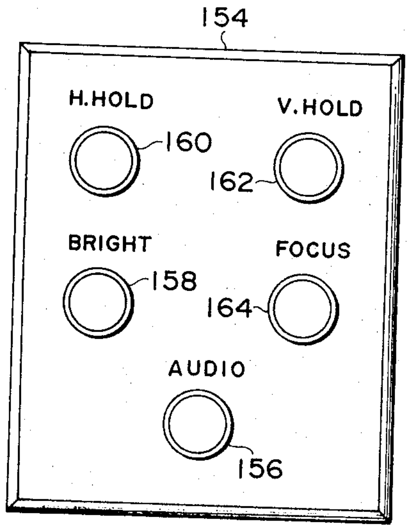

A video-to-audio selector switch 150 bearing the indication VIDEO and AUDIO is provided on the control panel 14. If this switch is turned to AUDIO, the magnitude of the audio-signal will be given on a level meter 152. If the switch is turned to VIDEO, the magnitude of the video-signal will be given also on the meter 152. As shown in FIG. 1, the control panel 154 is provided on one side of the housing 10. The control panel 154 is shown in detail in FIG. 6. A knob 156 bearing the indication AUDIO is on the control panel. The audio-to-video selector switch 150 is turned AUDIO for the meter 152 to indicate the instantaneous level of the audio-signal, and the magnitude of the audio-signal may be properly adjusted by rotating the AUDIO knob 156.

Likewise, the audio-to-video selector switch 150 is turned VIDEO for the meter 152 to indicate the instantaneous level of the video-signal, and the video-level may be properly adjusted.

Knobs 160, 162, 158 and 164 bearing the indications H. HOLD, V. HOLD, BRIGHT and FOCUS respectively are used for controlling the flying spot scanner 62. More specifically, the H. HOLD control knob 160 is used for horizontal synchronization; the V. HOLD control knob 162 is allotted for vertical synchronization, the BRIGHT control knob 158 is for controlling the brightness of the spot generated in the cathode ray tube 64; the "focus" control knob 164 is for controlling the spot size.

As mentioned earlier, in the embodiment given in FIG. 3 the electron beam in the cathode ray tube 64 of the flying spot scanner 62 is controlled with a view to preventing the deterioration of tube. This will be explained in detail as follows.

Usually, a negative dc bias voltage is obtained from the power supply, and is supplied to the grid electrode of the cathode ray tube to control the electron beam in the tube. However, there is a fear that deterioration of the tube will result from occasional increases of the electron beam due to the voltage fluctuation at the power supply. With a view to avoiding this deterioration a photovoltaic element 76 is positioned at the place where it can receive a part of the luminescence from the cathode ray tube, causing no hindrance to the sight of the raster on the phosphor screen of the tube. The photovoltaic element 76 is connected to a positive voltage supply +V through a resistance 166 which is included in the AGC circuit 78. The grid electrode of the tube 64 is connected to the connection point between the photovoltaic element 76 and the resistance 166.

Assuming that the intensity of the electron beam increases with the occasional rise of the voltage of the power supply the amount of luminescence received by the photovoltaic element will accordingly increase, and hence the magnitude of the voltage thus generated will rise. Therefore, the electric current flowing through the resistance 166 will increase with the result that the voltage across the resistance will rise. Accordingly the grid voltage of the tube will increase in the negative direction, thus lowering the intensity of the electron beam, and accordingly lowering the brightness of the flying spot emanating from the phosphor screen. Thus, the beam intensity can be maintained at a given constant value, and at the same time the deterioration of tube can be avoided.

A photoconductive element may be used in place of the photovoltaic element 76. The photoconductive element is connected to the dc power supply, and then the element will be responsive to the increase of the brightness to allow an increased electric current to flow through the resistance 166, thus finally increasing the voltage across the resistance.

As mentioned earlier, the PLAY button 138 on the control panel 14 if pushed, will cause the rotary solenoid 98 to be energized, thus pushing the film press roll 90, the sprocket 92 and the pinch roll 96 against the film 18, and locking them in this condition. Then the STOP button 142 is pushed, will cause a release means consisting of a pull solenoid to release the locking system, thus allowing the film press roll 90, the sprocket 92 and the pinch roll 96 to depart from the film 18, and at the same time allowing the rotary solenoid 98 to return to the initial position. Assuming that the PLAY button 138 is pushed and that the POWER switch 134 is turned "off" without pushing the STOP button 142, the pull solenoid will not operate, thus the film press roll 90, the sprocket 92 and the pinch roll 96 remaining engaged with the film 18. This prevents the cassette 16 from being removed, and if one should try to remove the cassette by force, the film 18 would be badly damaged. A protective device to prevent such careless handling is shown in FIG. 8.

Figure 8:
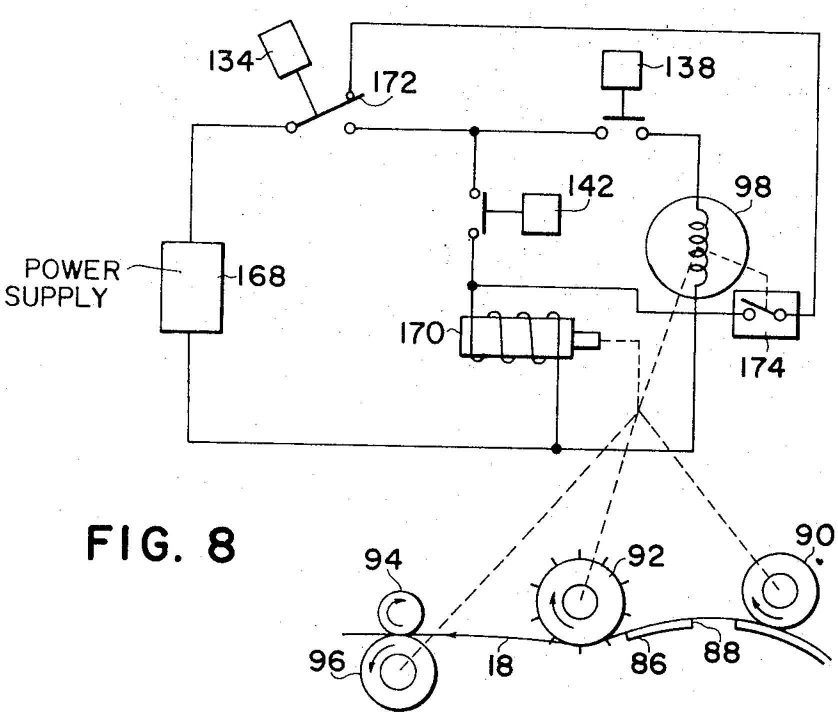
FIG. 8 shows a protective device responsive to the switching off of the electric power supply to put the pinch roller, film pressing roller and sprockets into the inoperative position, thus preventing the film from being damaged when the cassette is removed.

In FIG. 8 the power supply 168 is series-connected to the POWER switch 134, the PLAY button 138 and the rotary solenoid 98. Accordingly if the POWER switch 134 is in the closed position, and if the PLAY button 138 is pushed, the rotary solenoid 98 is energized with the result that the film press roll 90 the sprocket 92 and the pinch roll 96 are driven to resiliently push the film 18 against the guide plate 86 and the capstan 94. Then, if the STOP button 142 is pushed, the pull solenoid 170 is energized with the result that the film press roll 90, the sprocket 92 and the pinch roll 96 are unlocked, thus departing from the film 18.

The POWER switch 134 has a second contact 172 connected to the pull solenoid 170 through a transfer switch consisting of a microswitch 174. This microswitch is actuated by the rotary solenoid 98 in such a way that the microswitch 174 is closed in response to the energization of the rotary solenoid.

If the PLAY button 138 is pushed and if the POWER switch 134 is turned to the "off" without pushing the STOP button 142, the pull solenoid 170 will be energized through the second contact of the POWER switch 134 and the microswitch 174, thus causing the film press roll 90, the sprocket 92 and the pinch roll 96 to depart from the film 18. At the same time, the rotary solenoid 98 will return to the initial position, thus causing the microswitch 174 to open and at the same time, the pull solenoid 170 to be deenergized. Thus, complete protection of the film against careless operation can be attained by a simple device employing few parts.

However, there is the fear that the rotary solenoid 98 and the pull solenoid 170 will be heated and finally burnt by prolonged flow of electric current caused by pushing the PLAY button 138 or the STOP button 142 with the POWER switch 134, remaining closed, for a relatively long period. A device for protecting against this possible damage of solenoids 98 and 170 is shown in FIG. 9.

Figure 9:
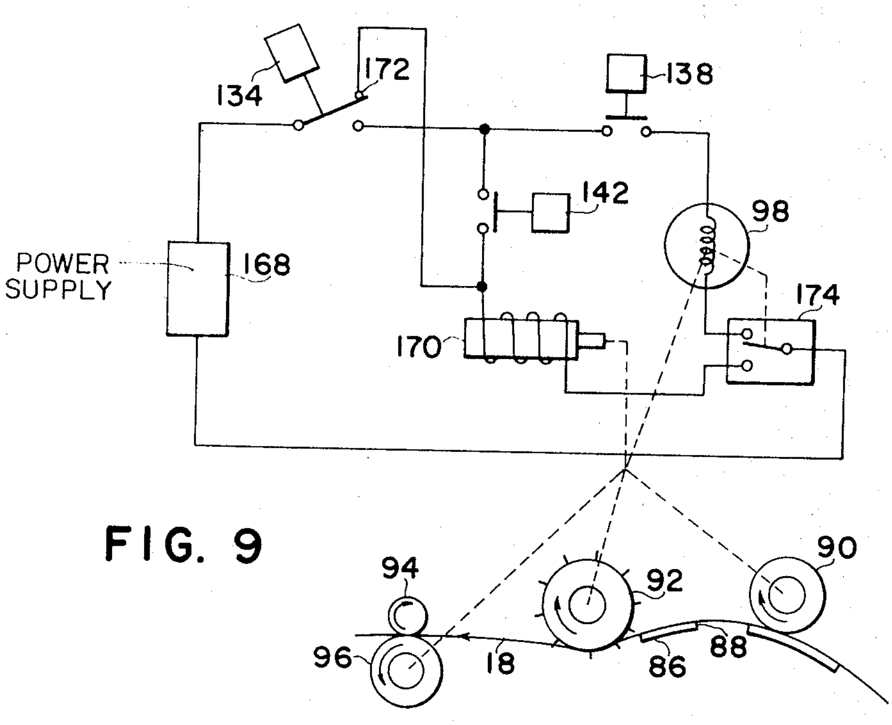
FIG. 9 shows another device similar to the one given in FIG. 8.

Referring to FIG. 9, the device is shown as comprising a first circuit series connecting the POWER switch 134, the PLAY switch 138, the rotary solenoid 98 and the microswitch 174 across the power supply 168; a second circuit series-connecting the POWER switch 134, the STOP switch 142, the pull solenoid 170 and the microswitch 174 across the power supply 168 and a third circuit series-connecting one terminal of the power supply 168 to the pull solenoid 170 through the second contact 172 of the POWER switch 134.

The operation of this device is as follows:

The POWER switch 134 is closed, and then the PLAY button 138 is pushed to energize the rotary solenoid 98 with the result that the film press roll 90, the sprocket 92 and the pinch roll 96 are pushed against the film 18. The rotary solenoid 98 is energized and then the microswitch 174 is operated, deenergizing the rotary solenoid 98 even if the PLAY button 134 remains pushed. Thus, the rotary solenoid 98 can be protected from being overheated and burned out.

The STOP button 142 is pushed to energize the pull solenoid 170, causing the film press roll 90, the sprocket 92 and the pinch roll 96 to depart from the film 18. Then, the rotary solenoid 98 returns to the initial position, and therefore the microswitch 174 is also put into the initial position. Accordingly, even if the STOP button 142 remains pushed, the solenoid 170 is prevented from being overheated and burnt out.

In this particular embodiment after the PLAY button 138 is pushed, and if the "POWER" switch 134 is turned off without pushing the STOP button 142, the pull solenoid 170 will be energized through the second contact 172 of the POWER switch 134, thus causing the film press roll 90, the sprocket 92 and the pinch roll 96 to depart from the film 18, and at the same time causing the rotary solenoid 98 and the microswitch 174 to return to the initial position, finally deenergizing the pull solenoid 170.

Thus, if the POWER switch 134 is turned off without pushing the STOP switch 142, the film 18 is protected from being damaged, and if the PLAY button 138 or the STOP button 142 is pushed for a relatively long period, the rotary solenoid 98 and the pull solenoid 170 are protected from being overheated and burnt out.

As shown in FIG. 3, the light passing through the film 18 is divided into red, green and blue components by the spectroscope 102. A spectroscope having a dichroic mirror can be used. However, the spectro characteristics of the dichroic mirror of the system must meet strict requirements, and the spectro-characteristics of such spectroscope cannot be amended once it has been made. Disadvantageously, a ghost is likely to appear at the boundary where the reflected light and the transmitting light depart from each other. A spectroscope having a dichroic mirror is very expensive, and therefore the use of such spectroscope will cause an increase in the cost of the final television signal generator to the extent that it will not be popular for home use.

Figure 10A:
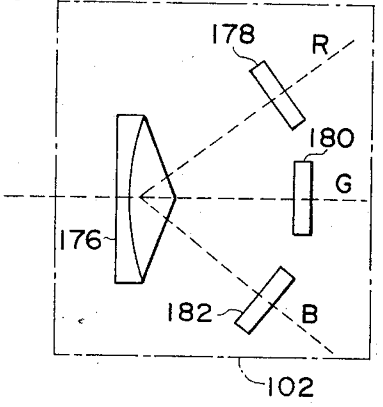
FIG. 10(*a*) shows a spectroscope using a "dach" prism and three different colored filters, and FIG. 10(*b*) is a perspective view of a "dach" prism.
Figure 10B:
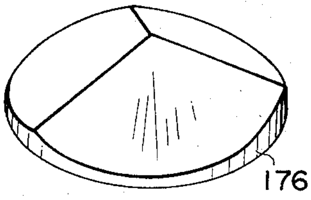

A tri-color spectroscope as shown in FIG. 10 is free from the disadvantages mentioned above in that it is inexpensive and permits easy adjustment of the color component beams. The tri-color spectro system shown in FIG. 10 comprises a "dach" prism 176 which is capable of dividing the incident light into three different beams of equal amount. The spectroscope also comprises red, green and blue filters 178, 180 and 182. The "dach" prism has three prism surfaces which function to divide the incident light into three different beams. These beams travel in the different radial directions 120° apart from each other. The radiating angle of each beam is so small that it constitutes substantially a collimated light beam.

The tri-color characteristics of the spectroscope 102 can be easily amended or modified simply by changing the colored filters 178, 180 and 182. In the spectro system using a dichroic mirror, this latter amendment or modification cannot be attained without rebuilding the whole system. Reflection of one beam at the colored filter will not adversely affect the other beams, and therefore such a ghost as is caused by multi-reflection in the dichroic mirror will not appear. The "dach" prism 176 and the colored filters 178, 180 and 182 are cheap and simple. Thus, a tri-color spectro system which is cheap and reliable in performance can be provided according to one aspect of the invention.

As shown in FIG. 3, a deflecting coil 66 and a focusing coil are mounted around the neck portion of the cathode ray tube 64 in the flying spot scanner 62. In a cathode ray tube of the type in which focusing is controlled by an electromagnetic coil, the coil and the electron beam must be aligned with each other. Usually an alignment control is provided to allow the coil to align the electron beam in the tube in such a way that any tendency for the electron beam in the individual tube to be more or less off-center may be compensated. The conventional alignment control is composed of a focusing coil mount which is capable of proper positioning. This alignment control is expensive, and complicated in structure.

Figure 11:
FIG. 11 is a perspective view of a wavy plate spring which is used in mounting a focusing electro-magnetic coil to the neck portion of the cathode ray tube.
Figure 12:
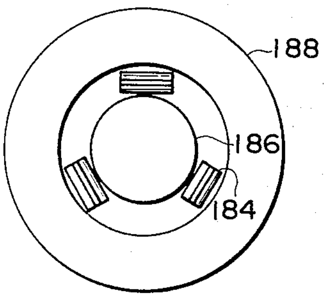
FIG. 12 is a cross-sectional view of the neck portion of the cathode ray tube with an electromagnetic coil mounted around the neck portion.

An alignment control member free from such disadvantages is shown in FIGS. 11 and 12.

As illustrated in FIG. 11, this alignment control member is composed of a corrugated strip 184 of a resilient material, such as phosphor bronze. As shown in FIG. 12, three corrugated strips are placed 120° apart from each other in the annular space between the neck portion of the tube and the focusing coil 188 with their longitudinal axes in the direction parallel to the axis of the neck of the tube.

The corrugated strips 184 can be moved along the circumference of the neck between the neck and the coil. Thus, the focusing coil can be aligned exactly with the central axis of the neck 186 by properly positioning the three strips around the neck. Advantageously, the focusing coil 188 is resiliently mounted around the neck of the tube.

Figure 13:
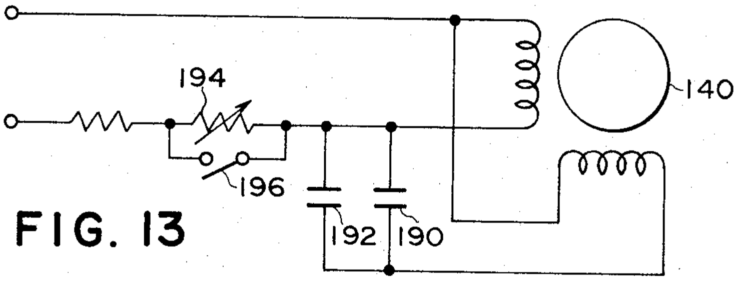
FIG. 13 shows a circuit for controlling the speed of the capstan driving motor.

Referring to FIG. 13, a control circuit for the motor 140 is shown. The motor 140 is a torque motor, one field winding of which is connected to capacitors 190 and 192 and a variable resistor 194. Across the variable resistor 194 is connected a switch 196 which is actuated by the SLOW switch 146. In the normal color-reproducing operation this switch 196 is closed to short circuit or exclude the variable resistor 194, thus causing the motor to run at a given constant speed. The closure of the SLOW switch 146 will cause the opening of the switch 196, thus putting the variable resistor in circuit with the field winding with the result that the a.c. signal is phase-shifted to finally reduce the running speed of motor 140. Then, if the variable resistor is adjusted to cause the phase-shift of the a.c. signal, the running speed of the motor will be controlled as desired.

As mentioned earlier, a color-reproduction compensating circuit 112 is provided in the system shown in FIG. 3. This compensator circuit functions to improve the purity of red color component. The principle and operation of the compensator circuit will be described as follows:

Compared with the use of the natural light or artificial white light in the color television camera, the luminescence or radiation from the phosphor screen is used in converting the color image information of the film into electric signals in the present television signal generator.

This invention uses a scanner cathode ray tube whose face plate is coated with a mixture of two different phosphors in place of a conventional scanner cathode ray tube having a non-mixed phosphor screen.

As is apparent from curve A (broken line) in FIG. 4, the non-mixed phosphor material has its central spectrum around the green region and has some intensity of luminescence in the red region.

Compared with this, a mixture of two different phosphor materials has two peaks around the blue and green regions but it has less energy of luminescence around the red region, although the energy spectrum is improved more or less in the red region. Also, the photomultiplier is less sensitive to light in the red region than to light of the other colors, and accordingly the signal-to-noise ratio in reproducing the color of red is very poor.

Figure 14:
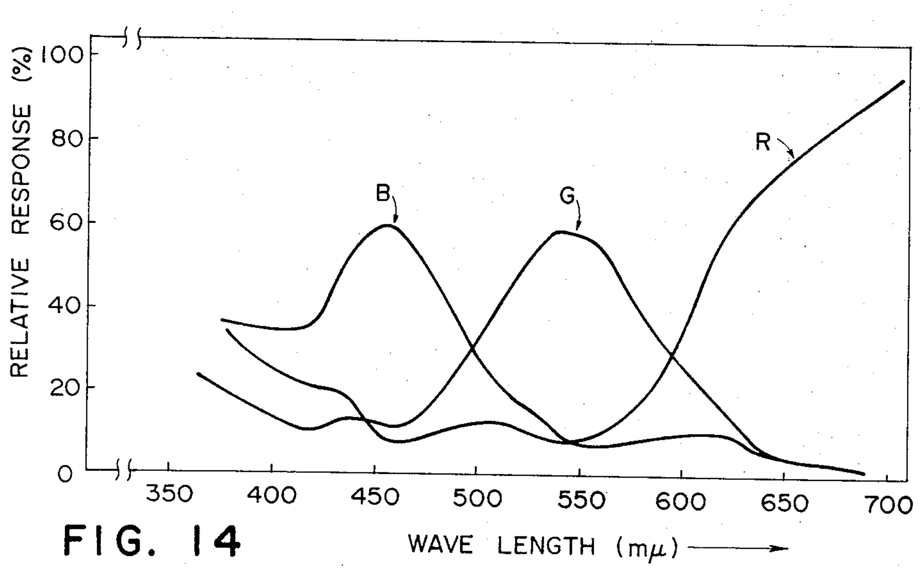
FIG. 14 is a graph showing the transparency characteristics of the color film in terms of the three component colors.
Figure 16:
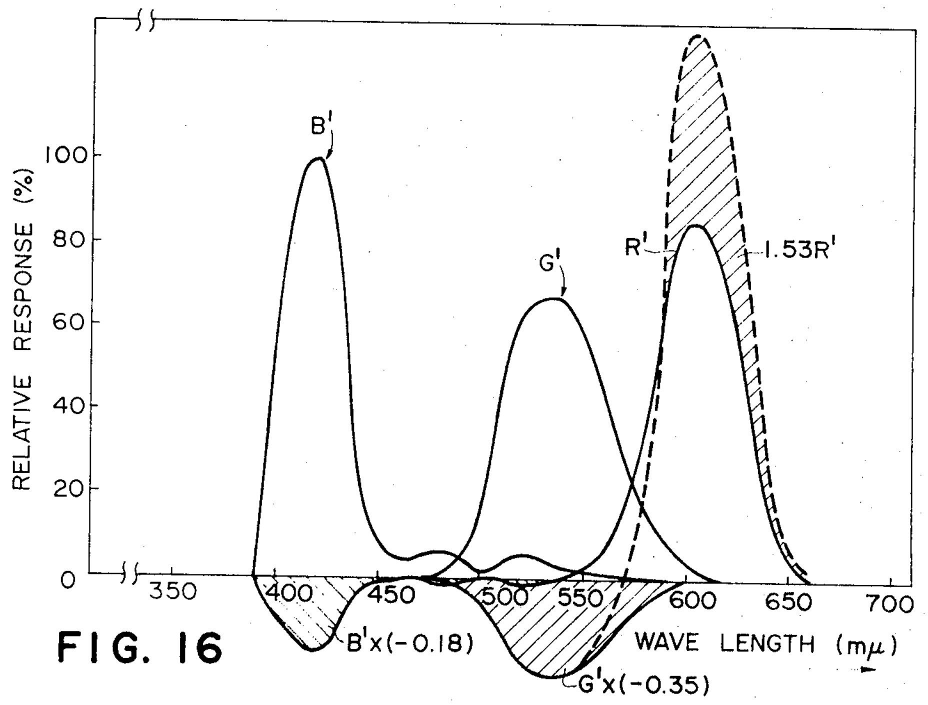
FIG. 16 is a graph showing how the fidelity of color reproduction is improved.

As seen from FIG. 14, the spectro-transparence characteristics of the color film shows that the other color components of substantial amount exist in the red region. Partly because of this and partly because the energy of luminescence from the phosphor screen lowers in the red region as mentioned earlier, the purity of red when reproduced will badly deteriorate. The energy spectrum of each color component in the region of wavelength from 540 mμ to 660 mμ is:

Table 1

| | |
|---|---|
| red color component | 50.5% |
| green color component | 35.4% |
| blue color component | 14.1% |

According to one aspect of this invention the mixed color components of substantial amount which are foreign to the red color component, particularly green and blue color components, can be eliminated thus improving the purity of color and at the same time reproducing whiteness in the balance condition.

Figure 15:
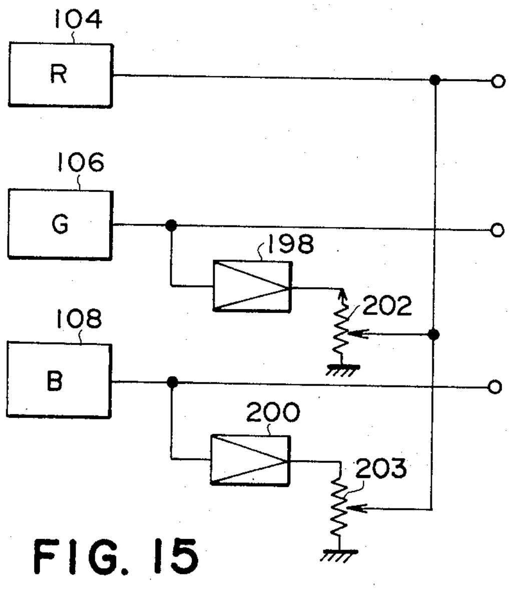
FIG. 15 shows a compensator circuit which is used to improve the fidelity with which the colored image is reproduced.

In a color reproduction compensating circuit as shown in FIG. 15 green and blue color signals G and B are amplified and reversed in phase inverters 198 and 200 respectively, and the signal thus inverted appear across the variable resistors 202 and 203 for the selected parts thereof to be added to the red color signal R at the output terminal of the photo multiplier 104.

The mixture rate can be controlled by properly adjusting the variable resistors 202 and 203 to obtain the best result.

First, the gain of the photomultiplier 108 producing the blue color signal is set at a given reference value. Then, the gain of the photomultiplier 106 producing the green color signal is set so that the surface integral of energy over a given region of wavelength in the green domain may be equal to the surface integral of energy over a given region of wavelength in the blue domain. The gain of the photomultiplier 104 producing the red color signal is set so that the surface integral of the red component output from the compensator circuit 112 may be equal to the surface integral of the blue component plus the surface integral of the green component.

For example, the variable resistors 202 and 203 are adjusted to derive the blue color signal of 18 percent and the green color signal of 35 percent, and the parts of these signals thus derived are reversed in phase, and then added to the red color signal to eliminate the foreign components from the red color signal. The gain of the "red" photomultiplier 104 is set so that the surface integral of the red color component is 1.53 times as large as the surface integral of the blue or green color component. Thus, the surface integrals of the component colors after compensated are equal to each other, and whiteness can be reproduced in the highly balanced condition. The occupation rate of the foreign color components in the red domain after compensation are:

Table 2

| | |
|---|---|
| red color component | 67.0% |
| green color component | 26.6% |
| blue color component | 6.4% |

This shows the remarkable improvement over the occupation rate of the foreign color components before compensation (cf. Table 1).

As mentioned above, the surface integrals of the color components after compensation are substantially equal to each other, and, accordingly the whiteness can be reproduced in the highly balanced condition, thus permitting the use of a simple linear matrix to produce Y, I and Q signals.

What is claimed is:

1. Apparatus for generating color television signals from a color film comprising:

a. a flying spot scanner for producing a raster, said flying spot scanner including a cathode ray tube having a phosphor screen, said phosphor screen emitting light having peak values in the green and blue spectral regions in response to excitation by an electron beam, b. a movable polygonal prism positioned to receive light from said raster and reflect said light on to said film, c. means for driving said film and said movable polygonal prisms in synchronous relation to obtain registration of the raster of said flying spot scanner on a frame of said film regardless of the film driving speed, d. spectroscopic means for dividing the light passing through said film into first, second and third color components which are primarily red, green and blue respectively, said first component having significant green and blue portions in addition to red, and e. means for coverting said color components into electrical signals, said means comprising first, second and third photomultipliers for receiving said first, second and third color components, and first and second phase inverters coupling the outputs of said second and third photomultipliers with reversed phase to the output of said first photomultiplier, the inverted outputs of said second and third photomultipliers reducing the portions of green and blue in the output of said first photomultiplier thereby improving color purity and reproduction of white in the balanced condition, the energy in the green and blue spectral regions of the light emitted by said phosphor screen providing signals for compensating for green and blue portions in the red signal at the output of said first photomultiplier.

2. The apparatus defined by claim 1 wherein said flying spot scanner includes a cathode ray tube having a grid electrode, said apparatus further comprising a photosensitive element positioned to receive light from a raster generated by said cathode ray tube, and an impedance element coupled between the output of said photosensitive element and a voltage source, the output of said photosensitive element being further coupled to the grid electrode of said cathode ray tube, the voltage on said grid electrode being controlled by the output of said photosensitive element to maintain constant electron beam intensity in said cathode ray tube despite variations in said voltage source.

3. The apparatus defined by claim 2 wherein said photosensitive element is a photovoltaic element.

4. The apparatus defined by claim 2 wherein said photosensitive element is a photoconductive element.

5. The apparatus defined by claim 2 wherein said impedance element is a resistor.

6. The apparatus defined by claim 1 which further comprises actuating and release means coupled to said film driving means for engaging and releasing respectively said film from said film driving means; a transfer switch operated by said actuating means, contacts on said transfer switch being closed when said film driving means is engaged with said film; a POWER switch having first and second switch positions; PLAY and STOP switches connected in series with said actuating and release means respectively between the first position of said POWER switch and a first terminal of a power source; and means coupling said transfer switch between the second position of said POWER switch and said release means, said actuating and release means being activated through said PLAY and STOP switches respectively when the first position of said POWER switch is coupled to the second terminal of the power source, and said release means being activated through said transfer switch when the second position of said POWER switch is coupled to said power source.

7. The apparatus defined by claim 6 wherein said actuating and release means are electrically operated solenoids and said transfer means is a microswitch having contacts which close when said actuating solenoid is energized.

8. The apparatus defined by claim 1 which further comprises actuating and release means for engaging and releasing respectively said film from said film driving means; a transfer switch operated by said actuating means having a first contact coupled to said actuating means and a second contact coupled to said release means, the first contact of said transfer switch being connected to a first terminal of a power source when said film driving means is released from engagement with said film and the second contact of said transfer switch being connected to the first terminal of said power source when said film driving means is engaged with said film; a POWER switch having first and second positions; PLAY and STOP switches connected in series with said actuating and release means respectively to the first position of said POWER switch; and means coupling the second position of said POWER switch to said release means, said actuating means being activated through said PLAY switch and the first contact of said transfer switch when the first position of said POWER switch is coupled to a second terminal of said power source, and said release means being activated either through said STOP switch and the second contact of said transfer switch when the first position of said POWER switch is coupled to the second terminal of said power source or directly through said POWER switch when the second position of said POWER switch is coupled to the second terminal of said power source.

9. The apparatus defined by claim 8 wherein said actuating and release means are electrically operated solenoids and said transfer switch is a microswitch having first, second and common contacts, said common contact being transferred from said first contact to said second contact when said actuating solenoid is energized and from said second contact to said first contact when said release solenoid is actuated.

10. The apparatus defined by claim 1 wherein said spectroscopic means comprises a prism having three surfaces for dividing light from said film into three separate beams transmitted in radial directions 120° apart from each other and first, second and third filters, each of said filters receiving one of said separate beams.

11. The apparatus defined by claim 10 wherein said first, second and third filters transmit red, green and blue light respectively.

12. The apparatus defined by claim 1 wherein said cathode ray tube has a focusing coil surrounding the neck of said tube and a plurality of corrugated resilient strips positioned in the annular space between said focusing coil and the neck of said tube, said corrugated strips being positioned to provide precise alignment of said focusing coil with respect to the central axis of the neck of said tube.

13. The apparatus defined by claim 12 wherein three corrugated resilient strips are positioned symmetrically around the neck of said tube, said strips being displaced 120° apart with their longitudinal axes parallel to the axis of the neck of said tube.

14. The apparatus defined by claim 1 wherein said means for driving said film and polygonal prism comprises a torque motor having a variable resistor connected to one winding thereof and a shorting switch coupled across said resistor, said motor operating at a first speed when said switch is closed and a lower speed when said switch is open, said variable resistor permitting adjusting of the phase of the voltage applied to the winding of said motor when said switch is open thereby controlling its speed.

15. The apparatus defined by claim 1 wherein first and second variable resistors are interposed between the output of said first and second phase inverters and the output of said first photomultiplier, said variable resistors permitting adjustment of the portions of the inverted outputs of said second and third photomultiplier coupled to the output of said first photomultiplier.

16. The apparatus defined by claim 1 wherein said phosphor screen comprises a mixture of phosphors.

* * * * *